United States Patent [19]

Juskey et al.

[11] Patent Number: 5,075,820
[45] Date of Patent: Dec. 24, 1991

[54] CIRCUIT COMPONENTS HAVING DIFFERENT CHARACTERISTICS WITH CONSTANT SIZE

[75] Inventors: Frank J. Juskey; Anthony J. Suppelsa; Anthony B. Suppelsa, all of Coral Springs, Fla.

[73] Assignee: Motorola, Inc., Schaumburg, Ill.

[21] Appl. No.: 563,575

[22] Filed: Aug. 6, 1990

[51] Int. Cl.5 .................... H01G 4/04; H01Q 1/38
[52] U.S. Cl. ....................... 361/327; 343/700 MS; 29/25.42
[58] Field of Search ............ 361/326, 327, 503, 504, 361/422; 343/700 MS; 29/25.42

[56] References Cited

U.S. PATENT DOCUMENTS 2,155,086  4/1939  Georgiev ........................ 175/315
3,899,720  8/1975  Peterson ........................ 357/74 X
4,131,893 12/1978  Munson et al. ............. 343/700 MS
4,513,354  4/1985  Abel ............................. 361/399
4,925,610  5/1990  Wessling et al. ............. 264/101

Primary Examiner—Donald A. Griffin
Attorney, Agent, or Firm—Daniel K. Nichols

[57]  ABSTRACT

A circuit component 100 or (200) comprising typically of a hollow body 101 (201) and a plurality of solderable terminations (102 and 103 (202 and 203) is being disclosed. Internal to said circuit component 100 (200) is a plurality of electrodes 104 and 106 (204 and 206). A filling point 108 (208) is provided so as to fill the volume of said circiut component (100 (200 ) with a specific compound 114 (214) having a desired electrical characteristics including dielectric constant. A method for manufacturing said circuit component 100 (200) is disclosed.

26 Claims, 3 Drawing Sheets

300

400

CIRCUIT COMPONENTS HAVING DIFFERENT CHARACTERISTICS WITH CONSTANT SIZE

TECHNICAL FIELD

This invention relates generally to circuit components and more specifically to circuit components having variable characteristics and is particularly directed toward capacitors and microstrip substrates having such characteristics.

BACKGROUND

In the design of electrical circuits the selection of components is greatly governed not only by their electrical characteristics but also their available sizes. The size of circuit components has always played a significant role in the design of equipments and their manufacture using manual or automated machines.

Problems arise in the design of electrical circuits due to component size variation based upon capacitance or inductance values and dielectric constants. Some of these problems are related to the proliferation of printed circuit boards internal to devices. Such proliferation is largely due to unavailability of common size components having different electrical values.

In communication devices where products are required to operate over an expanded spectrum the size of components is more critical in cost and inventory control. In such devices the variability of component sizes mandates the design of several printed circuit boards to accommodate same operation over an expanded spectrum. The commonality in component sizes allows a single printed circuit board to accommodate components with different electrical characteristics such as; value, tolerance, and temperature performance. This freedom affords the use of a single design of printed circuit board in a variety of devices.

In the manufacturing of electrical circuits the variations in component sizes require different tape and reel formats for the automatic pick and place machines. Once again resulting in increased inventory and cost.

Accordingly, a need exists for electrical circuit components to have different electrical characteristics contained in a uniform package. Additionally a need exists for a method to manufacture such electrical circuit components.

SUMMARY OF THE INVENTION

Briefly, according to the invention, a circuit component is comprised of a hollow body filled with a compound having a desired dielectric constant. The circuit component further including a plurality of solderable terminations and a plurality of electrodes. These electrodes may have patterns of metalization effectively coupling them to the compound in the hollow body.

Additionally, a method for manufacturing such circuit components is being disclosed. Said method includes molding of a hollow body with or without electrodes using known techniques such as injection, transfer, or RIM (reaction injection molding) in a two step procedure. The hollow body is subsequently injected with a high dielectric constant material using a filling point provided for on the hollow body.

DETAILED DESCRIPTION OF THE PREFERRED EMBODIMENT

Figure 1:
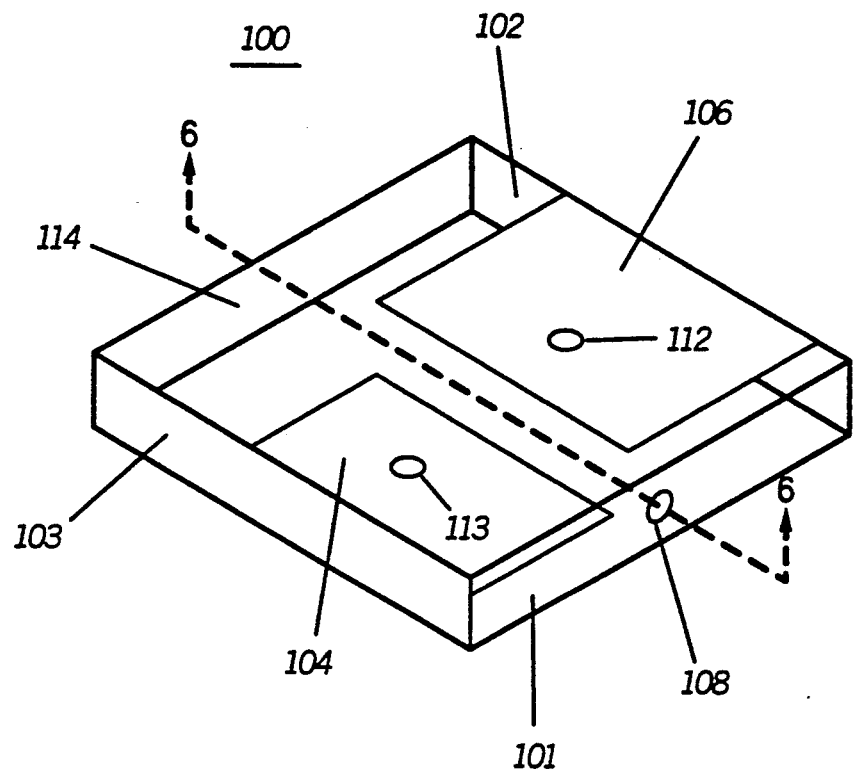
FIG. 1 is a capacitor in accordance with the present invention.

Referring to FIG. 1 a circuit component (capacitor 100) is shown in accordance with the present invention. The capacitor 100 comprises of a hollow body 101 including a plurality of solderable terminations 102 and 103. The terminations 102 and 103 are connected to a plurality of electrodes 104 and 106. The electrodes 104 and 106 participate in the determination of the electrical value of the capacitor 100. A dielectric fill point 108 is provided so as to add dielectric 114 to the hollow body 101. The plurality of electrodes 104 and 106 include metalized contact ports 112 providing contact between the plurality of electrodes 104 and the dielectric 114.

Figure 6:
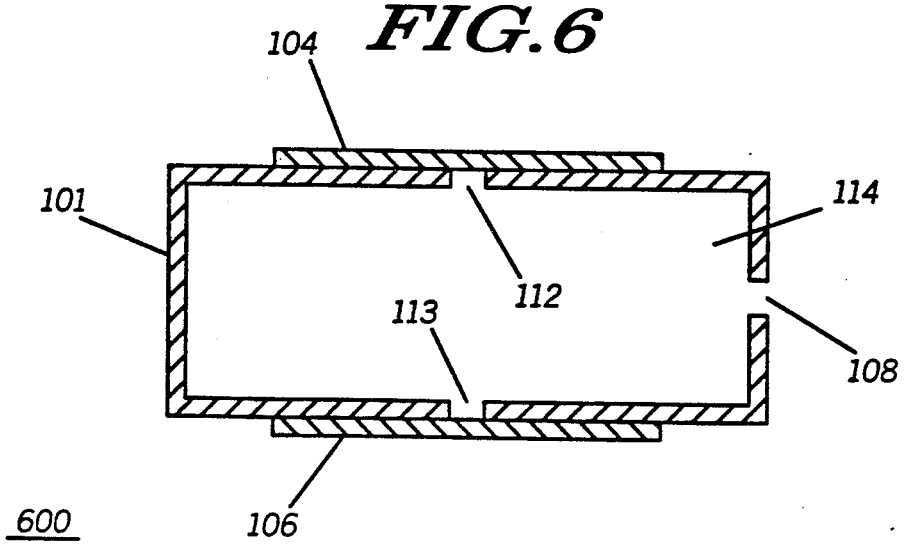

FIG. 6 shows a cross section of the capacitor 100 in which more details are presented. The hollow body 101 is filled with the dielectric 114 through the fill point 108.

The characteristics of dielectric 114 is what determines the electrical value and temperature performance of the capacitor 100. By varying the characteristics of dielectric 114 the electrical performance of the capacitor 100 can be altered leaving the package uniform. This would result in components such as the capacitor 100 having a constant size with different characteristics.

Several different dielectrics 114 are available for this application. The metalized contact ports 112 and 113 provide an electrical coupling between the dielectric 114 and the electrodes 106 and 104 respectively.

The molding of the hollow body 101 is accomplished using any known technology such as injection, transfer or RIM (Reaction Injection Molding) in a two step procedure. The resultant two halves are then either solvent or adhesively bonded together forming the hollow body 101. The hollow body 101 can be molded with or without conducting plates or electrodes 104 and 106.

Referring now to FIG. 6 a cross section of the capacitor 100 is shown.

The high dielectric powders 114 are insoluble in most usable solvents. Therefore it is necessary to blend these compounds with high melt point thermoplastic or B-staged thermosetting materials such as polyphenlyene sulfide, polyphenylene oxide, polyphenlyene ether, polyimides, polyethermides, cyanate esters, epoxies and aromatic polyester terephthalates. These high dielectric constant compounds act as a filler and can be dispersed into the thermoplastics. Upon melting the mixtures can be injected into the body of the compound using well known infection, transfer, or RIM technologies.

The high dielectric powders 114 are dispersed in a high melt temperature thermoplastic or B-staged thermoset resin using known rolling and kneading techniques. This dispersion is then hot melt injected into the hollow body 101, filling it with the high dielectric material 114. If the vent/contact hole of the device 100 is area dependent then the device 100 is held between two cooled non-stick platens during the filling operation. Sufficient force is used to maintain a good seal but not enough to cause the collapse of the device 100. Upon completion of the filling, the device 100 is metallized.

Using any of the known techniques such as thin film metal deposition, thick film polymer screening or electroless metal plating of the solderable terminations 102 and 103 is formed. Similarly the electrodes 104 and 106 are metalized to produce the contact ports 112 and 113. The specific geometrical pattern of the electrodes 104 and 106 can be formed either by standard mechanical milling away of excess metal or by chemical etching using photoresists.

The size of the hollow body 101 is kept constant while the electrical characteristics of the device 100 are changed using various dielectric materials 114. Such mechanism results in components having different electrical characteristics in a similar package. Greatly enhancing the interchangeability of components on a printed circuit board.

A discussion of preferred chemicals to use as the dielectric 114 is presented here. The following mainly discusses two distinct and different compounds which have a variable dielectric constant based upon processing and doping levels. These compounds are the polyphthalocyanines and the poly acene quinones. The polyphthalocyanines depend upon doping and complexing atoms to give rise to their variation in dielectric constant whereas the poly acene quinones are reacted at such high temperatures that they are partially pyrolized giving rise to their dielectric variation.

Figure 3:
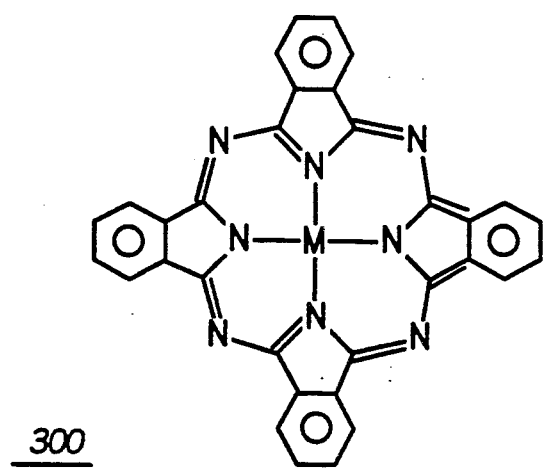
FIG. 3 is a general structure of polyphthalocyanines compounds.

Polyphthalocyanines compounds have a dielectric constant that varies from about 16 to about 1300. FIG. 3 shows a general structure of this class of compounds which contains an aromatic phthalocyanine ring structure on a aliphatic polymer backbone. The organic matrix is usually complexed or doped with either a metal or halogen atom to vary the dielectric constant. The most common complexing atoms are Al, Mn, or Fe and for doping I, Cl, or Br with I being the most common.

If Iron (Fe), Cobalt (Co) or Samarium (Sm) is used as the complexing atom the compounds not only have a modified dielectric constant but they also develop magnetic properties useful in modifying inductance. The dielectric constant gradually rises as the mole content of the dopant or complexing agent increases. These polymers have good chemical and thermal stability in the doped state and they physically appear as infusible, insoluble, amorphous solids.

The dielectric constant of the polyphthalocyanines can be controlled by the amount of dopant or complexing atoms in mole ratios. As larger atoms with higher electrongativities are used the greater the polarization and the higher the dielectric constant is driven. The use of ring activators such CN, S, —CH3 will also increase the dielectric constant.

Figure 4:
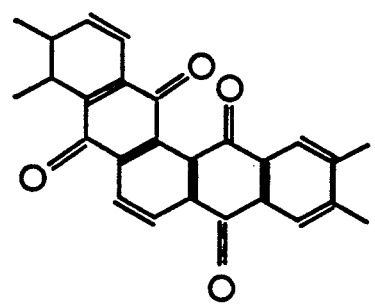
FIG. 4 is a general structure of poly acene quinones compounds.

Referring now to FIG. 4 a general structure of the second class of compounds the poly acene quinones is presented. These materials have dielectric properties very similar to the polyphthalocyanines. Their dielectric constants are dependant upon the number of replicate units in the polymer. They can be prepared only at extremely high temperatures (greater than 300° C.) in the form of infusible, black powders of variable composition. They have an extremely high dielectric constant which vary from about 30 to 10,000.

The theory of this high dielectric constant is believed to be due to the extremely high polarizability of electrons in the delocalized $\pi$ (Pi) orbitals. There is no dopant effect observed with these compounds. There is sufficient intermolecular order or crystallinity in the delocalized orbitals for a variable-range electron dopping mechanism to appear. As the name variablerange implies, charge transport occurs between states that may be spatially distant but is favorably located energetically.

The dielectric constant of the poly acene quinones can be controlled by judicious control of the reaction time and temperature to control the amount of conversion of the compound into the high molecular weights and high crystallinity.

Those skilled in the art appreciate the availability of other procedures and compounds to achieve similar results. The presentation of these procedures and mentioned compounds should be construed only as an example (and not as a limitation) to further clarify the preferred embodiment of the present invention.

Figure 2:
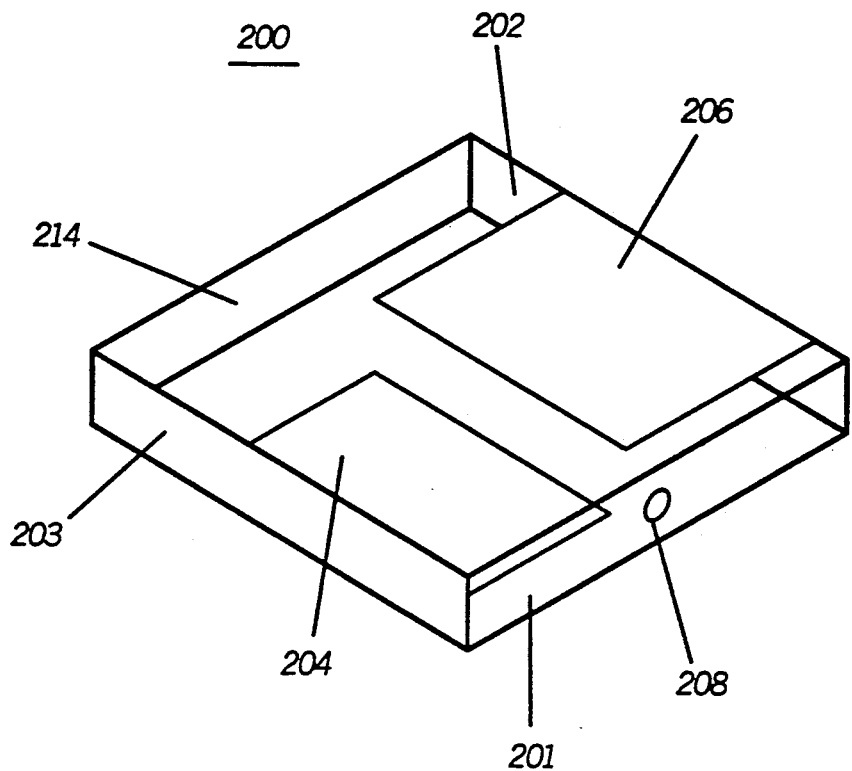
FIG. 2 is a microstrip substrate in accordance with the present invention.

Referring now to FIG. 2 a microstrip 200 is shown in accordance with the present invention. The microstrip 200 comprises of a hollow body 201 including a plurality of solderable terminations 202 and 203 to which are connected a plurality of electrodes 204 and 206. Said electrodes 204 and 206 participate in the determination of the electrical characteristics of the microstrip 200. A dielectric fill point 208 is provided so as to add dielectric 214 to the hollow body 201.

The characteristics of dielectric 214 is what determines the electrical value and temperature performance of the microstrip 200. By varying the characteristics of dielectric 214 the electrical performance of the microstrip 200 can be altered leaving the package uniform. This would result in microstrips such as the microstrip 200 having a constant size with different characteristics.

Several different dielectrics 214 are available for this application. The method and procedure presented above on capacitor 100 can similarly be applied to the assembly of microstrip 200. To avoid redundancy this procedure is not repeated here.

Figure 5:
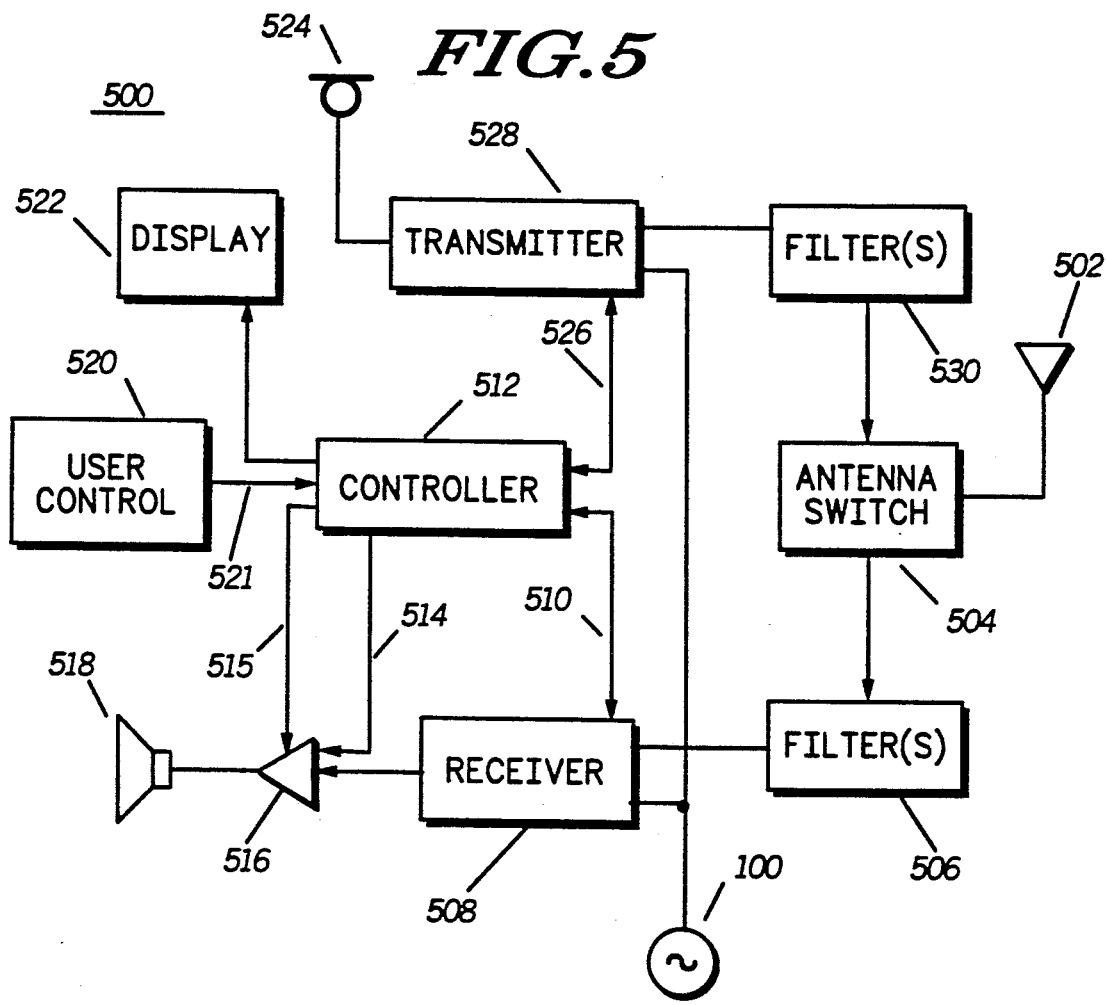
FIG. 5 is a block diagram of a communication device in accordance with the present invention.

Referring to FIG. 5, a radio communication device 500 in accordance with the present invention includes an antenna switch 504 that can selectively couple the antenna 502 to either a receiver 508 via filter(s) 506 or a transmitter 528 via filter(s) 530. The Oscillator 100 provides a reference frequency signal to the radio communication device 500.

To receive a message, a radio frequency signal is routed from an antenna 502 to a receiver 508 via the antenna switch 504 and a filter(s) 506. The receiver 508 may be of conventional design. The receiver 508 provides data messages to the controller 512 via data line 510. Typically, the controller 512 operates to alert the radio user and present a received message in a variety of ways depending upon the message type and optional features that may be enabled or disabled by the radio user. Thus the controller 512 may send an alert signal to an amplifier 516, via data line 514, to be presented to the radio operator via the speaker 518. After the alert, a voice message may be provided by the receiver 508 to the amplifier 516 for presentation via the speaker 518. Data messages would follow the radio's address code to the controller 512 via data line 510. Such messages are subsequently analyzed by the controller 510 and if appropriate sent to a display 522 for presentation.

Optionally the present invention can be applied to the transmitter section 528 of the radio communication device 500. To transmit a signal, a voice message is routed from the microphone 524 to the transmitter 528 for transmission via the antenna 502 through filter(s) 530 and antenna switch 504. Data messages are processed by the controller 512 and are subsequently presented to the transmitter 528 for transmission via the antenna 502 through filter(s) 530 and antenna switch 504.

The circuit component 100 (200) may be used in the receiver 508, the transmitter 528 or any other circuit block of the radio 500. Such use would afford the design of a single printed circuit board for each of the circuit blocks of the radio 500 for the size of the circuit components 100 and 200 remains constant as their electrical characteristics vary.

We claim:

1. An electrical circuit component having at least one electrical characteristic, comprising:
   a hollow body portion having an opening;
   a filler injected into said hollow body portion through the opening, said filler having a desired characteristic suitable for providing said electrical circuit component with said at least one electrical characteristic; and
   a metalization pattern on said hollow body portion.

2. The electrical circuit component of claim 1, wherein said desired electrical characteristic comprises its dielectric constant.

3. The electrical circuit component of claim 1, wherein said filler determines electrical performance of said circuit component.

4. The electrical circuit component of claim 3, wherein said electrical performance comprises its electrical value.

5. The electrical circuit component of claim 3, wherein said electrical performance comprises its temperature performance.

6. The electrical circuit component of claim 1, wherein said filler is at least partially in contact with said metalization pattern.

7. The electrical circuit component of claim 1, wherein said filler comprises polyphthalocyanines compounds.

8. The electrical circuit component of claim 1, wherein said filler comprises ploy acene quinones compounds.

9. A method of manufacturing electrical circuit components all having a constant body size and a selectable electrical characteristic, comprising the steps of:
   providing a hollow body portion having an opening;
   substantially filling said hollow body portion through said opening with a material having a selected characteristic;
   providing a metalization pattern on said hollow body; and
   providing coupling from said metalization pattern to said material.

10. A capacitor having a capacitance value, comprising:
    a hollow body portion having an opening;
    a filler injected into said hollow body portion through the opening, said filler having a desired characteristic suitable for providing said capacitor with said capacitance value;
    a metalization pattern on said hollow body portion.

11. The capacitor of claim 10, wherein said desired characteristic of said filler comprises its dielectric constant.

12. The capacitor of claim 10, wherein said filler is at least partially in contact with said metalization pattern.

13. The capacitor of claim 10, wherein said filler determines electrical performance of said capacitor.

14. The capacitor of claim 13, wherein said electrical performance comprises its electrical value.

15. The capacitor of claim 13, wherein said electrical performance comprises its temperature performance.

16. A microstrip having an electrical characteristic, comprising:
    a hollow body portion having an opening;
    a filler injected into said hollow body portion through the opening, said filler having a desired characteristic suitable for providing said microstrip with said electrical characteristic;
    a metallization pattern on said hollow body portion.

17. The microstrip of claim 16, wherein said desired electrical characteristic comprises its dielectric constant.

18. The microstrip of claim 16, wherein said filler determines electrical performance of said circuit component.

19. The microstrip of claim 18, wherein said electrical performance comprises its electrical value.

20. The microstrip of claim 18, wherein said electrical performance comprises its temperature performance.

21. A communication device, comprising:
    transceiver circuit for receiving and transmitting radio frequency signals including:
    an electrical circuit component having at least one electrical characteristic, comprising:
    a hollow body portion having an opening;
    a filler injected into said hollow body portion through the opening, said filler having a desired characteristic suitable for providing said electrical circuit component with said at least one electrical characteristic; and
    a metalization pattern on said hollow body portion.

22. The electrical circuit component of claim 21, wherein said desired electrical characteristic comprises its dielectric constant.

23. The electrical circuit component of claim 21, wherein said filler determines electrical performance of said circuit component.

24. The electrical circuit component of claim 23, wherein said electrical performance comprises its electrical value.

25. The electrical circuit component of claim 23, wherein said electrical performance comprises its temperature performance.

26. The electrical circuit component of claim 21, wherein said filler is at least partially in contact with said metalization pattern.

* * * * *